Nov. 15, 1927.
A. E. F. MOONE
1,648,909
SWITCHING MECHANISM FOR REELS FOR ELECTRIC CONDUCTORS
Filed Nov. 9, 1923
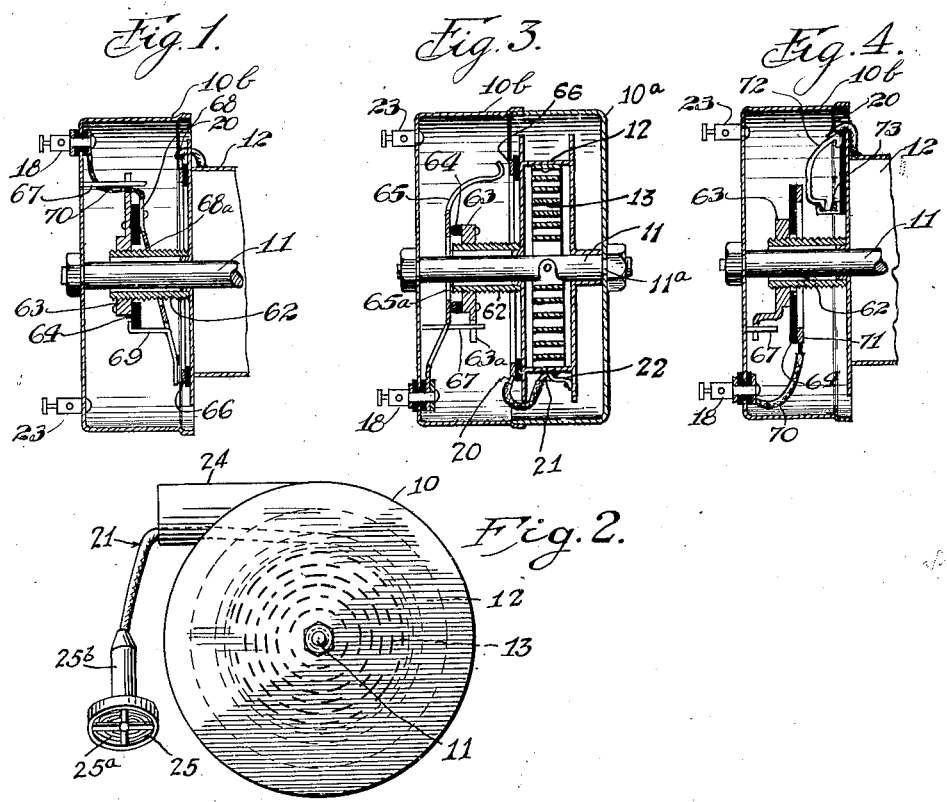
INVENTOR.
Albert E.F. Moone.
BY Albert C. Bree
ATTORNEY.

Patented Nov. 15, 1927.

1,648,909

UNITED STATES PATENT OFFICE.

ALBERT E. F. MOONE, OF CHICAGO, ILLINOIS, ASSIGNOR OF ONE-THIRD TO J. M. COUGHLIN, OF CHICAGO, ILLINOIS.

SWITCHING MECHANISM FOR REELS FOR ELECTRIC CONDUCTORS.

Application filed November 9, 1923. Serial No. 673,782.

My invention relates to an improved form of switching mechanism for use with reels for holding electric conductors, so that for one position of the reel, for example with the conductor in wound condition thereon, the electric circuit to the conductor may be opened and for another condition of the reel, for example with the electric conductor unwound to a desired degree from the reel, the electric circuit to the conductor may be closed. Reels of the kind referred to may be employed for various purposes, for example, for holding electric conductors extending to cigar lighters, to electric lamps and other purposes where it is desired to control the circuit to the operated device by the wound or unwound condition on the reel of the electric conductor connected with the device. The reel may be provided in any desired manner with devices for winding the conductor thereon, for example, a suitable spring or springs may be employed tending to rotate the reel to wind up the conductor, it being understood that the winding of the reel may be accomplished in any desired manner, the only requisite in connection with my invention being that there shall be contact mechanism actuated by intermediate devices forming no part of the contact mechanism, said intermediate devices being given one position or another by rotation of the reel, so that they may in turn move the switch contacts of the contact mechanism to opened or closed position as the case may be, the opened condition of the switching mechanism being effected by the intermediate devices when the conductor is nearly or quite wound upon the reel and the closed condition of the switching mechanism being effected by the intermediate devices when the conductor is more or less unwound from the reel and preferably continued thereafter for any amount of conductor that may be unwound from the reel.

A device of the kind described may be used for many purposes, for example for controlling the electric current flow to an electric cigar lighter which may be used in automobiles or in homes and where used may be operative over a considerable range of distance from the device, so that in whatever position or location the lighter is used, it will be in heated condition due to the electric current communicated to it through the automatic control of the switching mechanism, and that when it is not in use and the conductor is nearly or quite wound on the reel, the flow of electric current to the lighter is automatically disconnected without any thought on the part of the user, excepting the winding of the conductor on the reel where the winding is effected manually. Similarly, the device may be used to control the operation of a portable electric light, so that when a light is desired for any reason at a distance from the device, the conductor is drawn from the reel, the light is lighted by the automatic switching devices, and the light is automatically extinguished when the conductor is again wound on the reel. In this manner danger of overheating the heating element of the cigar lighter in the one case and unnecessary consumption of the filament in the electric lamp in the other case is avoided without thought on the part of the user of the device.

My invention will best be understood by reference to the accompanying drawings showing preferred embodiments of my invention in which Fig. 1 is a central sectional view through the casing containing the reel and switching mechanism, Fig. 2 shows in side elevation the device illustrated in Fig. 1, with a cigar lighter connected with the conductor.

In Figs. 3 and 4 different forms of switching mechanism are shown in views similar to Fig. 1, operated by a modified form of intermediate actuating devices from that shown in Fig. 1.

Similar numerals refer to similar parts throughout the several views.

As shown in Fig. 1 the device consists of a casing 10 consisting preferably of a body portion 10$^a$ and a cover portion 10$^b$ which are separable to facilitate assembling and repairing the parts as may be necessary, both of these portions being preferably cup shaped. A central shaft 11 extends axially through the casing to which it is secured against rotation by the end nuts indicated and also preferably by a flattened surface 11$^a$ formed on one end thereof engaging a similar conformation in the casing. The shaft 11 has mounted thereon in the casing a reel 12 which preferably is hollow and contains a spring 13, one end of which is secured to the reel and the other end to the shaft 11, in a manner such that an electric conductor wound on the reel will wind up the spring as it is drawn from the reel, such spring tending to wind the conductor on the reel when pull on the conductor is released. The reel 12 has rigidly secured thereto a sleeve 62 surrounding and clearing the shaft 11, said sleeve being provided with external threads for controlling the operation of the intermediate switch operating devices. The sleeve 62 carries a threaded nut 63 which in turn carries an insulating ring 64 engaging a contact spring 65, the lower end of which is secured to and insulated from the cap 10$^b$ by the binding post 18, constituting one terminal of the device. The spring 65 is provided with a clearance opening 65$^a$ to clear the shaft 11 and sleeve 62, and the upper end of the spring is continued to engage a contact ring 66 carried by and insulated from the end of the reel 12, to which contact ring the wire 20 is connected, preferably by soldering. The nut 63 is slotted as indicated at 63$^a$ to be engaged by a rod 67 carried by and extending inwardly from the cap 10$^b$ in substantially parallel relation to the shaft 11. The contact spring 65 is so proportioned that when, by the winding operation, the conductor is nearly wound upon the reel, the nut 63 is moved sufficiently to the left to separate the contact spring 65 from the contact ring 66. With the arrangement shown, left hand threads are provided on the sleeve 62 and in the nut 63, although it will be understood that the direction of these threads is taken in any case to secure the desired operation depending upon the particular arrangement of the spring 13 in the reel.

The relation of the parts is such that when the conductor is nearly or quite wound on the reel by the action of the spring 13, the nut 63 is moved on the sleeve 62 far enough from the reel to move the contact spring 65 from engagement with the contact ring 66, thus opening the circuit of the device. The rod 67 prevents rotation of the nut 63 when the reel 12 is rotated. When the conductor is drawn from the reel, the nut 63 is moved in the reverse direction permitting the spring 65 to engage the contact ring 66, thus closing the circuit through the device. It will be understood that this closing may be accomplished when any desired amount of conductor is drawn from the reel depending upon the adjustment of the nut 63 and of the bent end of the contact spring 65. It will further be observed that after the contact spring 65 makes contact with the contact ring 66, the remaining portion of the conductor may be drawn from the reel without changing the relation of engagement between the contact spring 65 and the contact ring 66, all that occurs at this time being that the nut is moved further from the contact spring towards the reel depending upon the amount of rotation of the reel. The other terminal of the device consists of a binding post 23 mounted directly on the cap 10$^b$, electrical connection being made through the casing, the shaft and the reel to the wire 22.

As shown in Fig. 2 the casing 10 has projecting tangentially from the edge thereof, a guide tube 24 in line with the reel 12, through which the electric conductor 21 extends to the device to be supplied with electric current, the device illustrated at 25 being a cigar lighter having an electrically heated element 25$^a$ connected with the wires of the conductor 21, said lighter being provided with a handle 25$^b$ by which the device may be conveniently manipulated. The tension on the spring is sufficient to draw the conductor into the tube 24 so that the handle 25$^b$ is in the outer end of the tube when the device is not in use and the adjustment of the contact mechanism shown in Fig. 1, is preferably such that when the conductor 21 is in substantially the condition of winding shown in Fig. 2, the contact 65 is separated from the contact ring 66 so that a slight additional separation is provided before the handle 25$^b$ enters the tube 24, thus insuring against the possibility of current flow through the heating element 25$^a$, whether the handle 25$^b$ is in the end of the tube 24 or merely hangs adjacent to it. As a result of this adjustment, when the conductor 21 is drawn from the casing 10 to any extent that it must be drawn so that the lighter may be used, the spring contact 65 is in engagement with the contact ring 66 and current flows through the heating element 25$^a$, assuming that the binding posts 18 and 23 are connected with a suitable source of current supply; also that this condition of current flow continues, however much of the conductor 21 is drawn from the reel 12, so that the lighter may be used at different distances from the casing 10. It will be understood that the cigar lighter 25 may be replaced by any other device to be operated by current flow through the conductor 21, for example an electric light bulb or other device it may be desired to use at varying distances from the casing 10, and that the control of current flow through said operated device is the same as described for the cigar lighter 25.

In the construction shown in Fig. 3, the sleeve 62 carries a nut 63 which in turn carries an insulating ring 64, and to the ring 64 a contact spring 68 is rigidly secured, said spring being provided with a clearance opening 68$^a$ to clear the sleeve 62. The contact spring 68 is extended beyond the sleeve 62 so that its end is adjacent the contact ring 66 carried by and insulated from the adjacent end of the reel 12. The wire 20 is connected with the contact ring 66, preferably by soldering. The contact spring 68 has extending therefrom an arm 69 having a bent end engaging the edge of the contact ring 64 when the nut 63 is in its position most remote from the reel 12. In this position the contact spring 68 is held from engagement with the contact ring 66 to open the circuit through the device. The contact spring 68 is connected by a wire 70 with binding post 18 carried by and insulated from the cap 10$^b$. The contact devices described are proportioned so that when the conductor is nearly wound on the reel 12 the contact spring 68 is moved from engagement with the contact ring 66 and the results secured by this operation are substantially the same as secured by the construction shown in Fig. 1.

With the construction shown in Fig. 4 the nut 63 carries an insulating ring 64 which in turn carries a contact ring 71. The adjacent end of the reel 12 carries an insulated contact spring 72 having a hook shaped free end engaged by a correspondingly hook shaped retaining member 73 also carried by and insulated from the end of the reel 12. The contact spring 72 occupies a position adjacent the contact ring 71 so as to be just out of contact therewith when the conductor is nearly wound on the reel 12. The wire 20 is connected with the contact spring 72, preferably by soldering and the contact ring 71 is connected by wire 70 with binding post 18 carried by the end of the cap 10$^b$ and insulated therefrom. In connection with each of Figs. 3 and 4 the construction not particularly shown and described is substantially the same as that described in connection with Fig. 1 and operates in substantially the same manner.

While I have shown my invention in the particular embodiments above described, it will be understood that I do not limit myself to this exact construction as I may employ equivalents known to the art at the time of the filing of this application without departing from the scope of the appended claims.

What I claim is:

1. In a conductor winding device, the combination of a rotary reel, a casing, a threaded member carried by said reel and extending axially therefrom, a nut threaded on said threaded member and restrained from rotation therewith, an insulated contact ring carried by said reel, a contact spring carried by and insulated from said nut for engagement with and disengagement from said contact ring, and a retaining member carried by said nut for limiting expansion of said contact spring.

2. In a conductor winding device, the combination of a rotary reel, a threaded cylindrical member rotary with said reel, a threaded nut on said member and restrained from rotary movement therewith, whereby rotation of said member moves said nut longitudinally of said member, a first insulated contact carried by the reel, a second insulated contact movable by said nut to engage said first contact and be disengaged therefrom by rotation of said reel, said second contact being carried by said nut, said second contact being spring actuated and having engagement with said first contact for a desired amount of rotation of said reel, and a stop device for restraining said second contact at the end of said amount of rotation to separate said contacts from each other.

3. In a conductor winding device, the combination of a rotary reel, a threaded cylindrical member rotary with said reel, a threaded nut on said member and restrained from rotary movement therewith, whereby rotation of said member moves said nut longitudinally of said member, a pair of insulated contacts for making and breaking a circuit through a conductor on said reel, comprising a slip ring and a spring contact for engaging the same, one of said contacts being carried by said reel and the other of said contacts being actuated by movement of said nut, and a stop engaging said spring contact at the end of a desired amount of rotation of said reel to separate said contacts.

In witness whereof, I hereunto subscribe my name this 1st day of November, A. D. 1923.

ALBERT E. F. MOONE.